United States Patent [19]

Abusleme et al.

[11] Patent Number: 5,569,728
[45] Date of Patent: Oct. 29, 1996

[54] (CO)POLYMERIZATION PROCESS IN SUSPENSION FOR PREPARING HYDROGEN CONTAINING THERMOPLASTIC FLUOROPOLYMERS

[75] Inventors: Julio A. Abusleme, Saronno; Piero Gavezotti, Milan, both of Italy

[73] Assignee: Ausimont, S.p.A., Milan, Italy

[21] Appl. No.: 405,811

[22] Filed: Mar. 16, 1995

[30] Foreign Application Priority Data

Mar. 21, 1994 [IT] Italy ................. MI94A0521

[51] Int. Cl.$^6$ ........................................ C08F 4/32
[52] U.S. Cl. ........................... 526/231; 526/249
[58] Field of Search ............................ 526/231

[56] References Cited

U.S. PATENT DOCUMENTS

| | | |
|---|---|---|
| 2,559,630 | 7/1951 | Bullitt, Jr. . |
| 2,580,358 | 12/1951 | Miller et al. ............... 526/231 |
| 3,053,820 | 9/1962 | Wechsler et al. . |
| 3,624,250 | 11/1971 | Carlson ............... 260/80.75 |
| 3,642,742 | 2/1972 | Carlson . |
| 3,865,845 | 2/1975 | Resnick ............... 260/340.9 |
| 3,978,030 | 8/1976 | Resnick ............... 526/247 |
| 4,513,129 | 4/1985 | Nakagawa et al. ............... 526/249 |
| 4,524,194 | 6/1985 | Dumoulin ............... 526/84 |
| 4,739,024 | 4/1988 | Moggi et al. ............... 526/216 |
| 5,182,342 | 1/1993 | Feiring ............... 526/206 |

FOREIGN PATENT DOCUMENTS

| | | |
|---|---|---|
| 0073087 | 3/1983 | European Pat. Off. . |
| 0076581 | 4/1983 | European Pat. Off. . |
| 0080187 | 6/1983 | European Pat. Off. . |
| 0093404 | 11/1983 | European Pat. Off. . |
| 0185242 | 6/1986 | European Pat. Off. . |
| 0526216 | 2/1993 | European Pat. Off. . |
| 0606492 | 7/1994 | European Pat. Off. . |
| 0612767 | 8/1994 | European Pat. Off. . |

OTHER PUBLICATIONS

*Chemical Abstracts*, vol. 109, No. 12, Sep. 19, 1988, Columbus, Ohio, USA, A. Naraki, "Peroxide–Vulcanizable Fluoro Elastomers and their Manufacture", p. 65, No. 94 564f & JP–A–63 023 907.

*Chemical Abstracts*, vol. 87, No. 6, Aug. 8, 1977, Columbus, Ohio, USA, S Sakai, "Heat–Resistant Hexafluoropropylene–Tetra–fluoroethylene Copolymers", p. 26, No. 40 193t & JP–A–77 000 887.

*Chemical Abstracts*, vol. 102, No. 6, Feb. 11, 1985, Columbus, Ohio, USA, Daikan Kogyo Co. Ltd., "Ethylene–Tetrafluoroethylene Copolymers", p. 36, No. 46 735w & JP–A–59 147 007.

Copending Application Serial No. 08/405,799 filed March 16, 1995, Abusleme et al, "Process for Preparing Thermoplastic Hydrogen–Containing Fluoropolymers".

*Primary Examiner*—Joseph L. Schofer
*Assistant Examiner*—N. Sarofim
*Attorney, Agent, or Firm*—Watson Cole Stevens Davis, P.L.L.C.

[57] ABSTRACT

The invention relates to a (co)polymerization process in suspension for preparing hydrogen containing thermoplastic fluoropolymers, such as for instance ethylene/chlorotrifluoro-ethylene or ethylene/tetrafluoroethylene copolymers, or vinylidenefluoride homopolymers or copolymers, wherein bis-dichlorofluoroacetylperoxide ($CFCl_2$—CO—O)$_2$ (DCFAP) is used as polymerization initiator. From such process products endowed with high thermal stability, remarkably higher than that obtainable using bis-trichloroacetylperoxide (TCAP), are obtained.

16 Claims, No Drawings

(CO)POLYMERIZATION PROCESS IN SUSPENSION FOR PREPARING HYDROGEN CONTAINING THERMOPLASTIC FLUOROPOLYMERS

The present invention relates to a (co)polymerization process in suspension for preparing hydrogen containing thermoplastic fluoropolymers.

Various types of hydrogen containing fluorinated polymers having thermoplastic properties are known in the art. A first class is constituted by copolymers of per(halo)fluoroolefins with olefins not containing halogens, such as for instance tetrafluoroethylene (TFE) or chlorotrifluoroethylene (CTFE) copolymers with ethylene, optionally containing a third fluorinated comonomer in amounts from 0.1 to 10% by mols (see for instance U.S. Pat. No. 3,624,250). The preparation of such copolymers is generally carried out in suspension and, especially for CTFE/ethylene copolymers, it is preferably carried out at a low temperature (lower than 30° C.). A low polymerization temperature is necessary to favour monomer alternation, avoiding formation of ethylene blocks which would cause a worsening of mechanical properties and would render the product thermally unstable.

Another class of hydrogen containing thermoplastic fluoropolymers is constituted by polyvinylidenefluoride (PVDF) and by PVDF modified with small amounts (0.1–10% by moles) of other fluorinated comonomers. Such polymers can be prepared by (co)polymerization in suspension, as described for instance in EP-526,216, preferably in the presence of a suitable suspending agent, for instance polyvinylalcohol or water-soluble cellulose derivatives, as described in U.S. Pat. No. 4,524,194. Depending on the type of the used initiator, it is possible to operate within a wide temperature range, even below 30° C. By working at low temperatures it is possible to obtain a higher structural regularity, in particular a reduction of monomer inversions and consequently a higher crystallinity percentage, from which, as known, a higher second melting temperature, and therefore a higher rating temperature, derives.

However, the fact of working at low temperatures does not automatically grant a high thermal stability, since the latter depends also on the nature of chain end groups deriving from the polymerization initiator. It is indeed known that such end groups can be per se unstable and their decomposition can in turn originate dehydrohalogenation reactions along the polymer chain, with development of halogenidric acids and formation of double bonds, which impart to the product undesired colouring (the so called phenomenon of "discoloration") and constitute preferential points for macromolecule breakage.

Because of the low react ion temperature, the radical initiators employable in such process can be selected within a rather restricted class. The most commonly used are bis-acylperoxides of formula $(R_f-CO-O)_2$, wherein $R_f$ is a (per)haloalkyl $C_1-C_{10}$ (see for instance EP-185,242 and U.S. Pat. No. 3,624,250). Among them, bis-trichloroacetylperoxide (TCAP) is particularly preferred.

The Applicant has now surprisingly found that, within the bis-acetylperoxide class, bis-dichlorofluoroacetylperoxide $(CFCl_2-CO-O)_2$ (DCFAP) allows to prepare hydrogen containing thermoplastic fluoropolymers endowed with high thermal stability, remarkably higher than that obtainable by using bis-trichloroacetylperoxide. In particular, the obtained (co)polymers show high resistance to dehydrohalogenation, therefore they do not show discoloration phenomena especially during high temperature processing stages.

Therefore, object of the present invention is a (co)polymerization process in suspension for preparing hydrogen containing thermoplastic fluoropolymers, wherein bis-dichlorofluoroacetylperoxide $(CFCl_2-CO-O)_2$ (DCFAP) is used as polymerization initiator.

DCFAP can be prepared by oxidation in an alkaline medium of the corresponding acyl-halide, according to what described for instance by Z. Chengxue in J. Org. Chem., 47, 2009–2013 (1982).

The DCFAP amount to be used in the process object of the present invention is generally from 0.005 to 20% by weight, preferably from 0.05 to 2% by weight, with respect to the total amount of monomers. The addition to the reaction medium can be carried out both in a sole portion at the beginning of the reaction, or gradually, continuously or in discrete amounts, during the polymerization.

The process object of the present invention is generally carried out at a temperature of from −30° to +30° C., preferably from −10° to +20° C., while the reaction pressure is comprised within wide limits, generally from 5 to 100 bar, preferably from 10 to 40 bar.

The reaction medium is constituted by an organic phase, to which water is usually added to favour dispersion of the heat developing during the reaction. The organic phase can be formed by the monomers themselves, without adding any solvents, or by the monomers dissolved in a suitable organic solvent. Chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc. are conventionally used as organic solvents. Since such products deplete the stratosphere ozone, alternative products have lately been proposed, such as compounds containing only carbon, fluorine, hydrogen, and optionally oxygen, described in U.S. Pat. No. 5,182,342. A valid alternative is constituted by branched chain hydrocarbons as described in EP-612,767, having from 6 to 25 carbon atoms and a ratio between number of methyl groups and number of carbon atoms greater than 0.5, such as for instance 2,3-dimethylbutane, 2,3-dimethylpentane, 2,2,4-trimethylpentane, 2,2,4,6,6-pentamethylheptane, 2,2,4,4,6-pentamethylheptane, etc. or mixtures thereof.

To control molecular weight of the final product, suitable chain transfer agents can be added to the reaction system, such as: ketones, esters, ethers or aliphatic alcohols having from 3 to 10 carbon atoms, hydrocarbons or halogenated hydrocarbons, having from 1 to 6 carbon atoms; bis(alkyl)carbonates wherein the alkyl has from 1 to 5 carbon atoms; etc. Among them, chloroform and methylcyclopentane are particularly preferred. The use of methylcyclopentane and more generally of cyclopentanes alkyl-substituted with one or more $C_1-C_6$ alkyls as chain transfer agents in processes for preparing at low temperature hydrogen-containing fluorinated (co)polymers is described in a copending patent application in the name of the Applicant (Italian patent application No. 000520 MI94A, filed 21 Mar. 1994). The chain transfer agent is fed into the reactor at the beginning of the reaction, or continuously or in discrete amounts during the polymerization. The amount of chain transfer agent to be used can range within quite wide limits, depending on the type of used monomers, on the reaction temperature and on the desired molecular weight. Generally, such amount ranges from 0.01 to 30% by weight, preferably from 0.05 to 10% by weight, with respect to the total amount of monomers fed into the reactor.

By hydrogen containing thermoplastic fluoropolymers it is meant all of those polymers having thermoplastic properties obtainable by homopolymerization of a hydrogen-containing fluoroolefin or copolymerization of the latter with a perfluorinated monomer, or by copolymerization of a per(halo)fluoroolefin with a fully hydrogenated olefin. Particularly, the process object of the present invention can be advantageously used for:

(1) copolymers between a $C_2$–$C_8$ per(halo)fluoroolefin, for instance tetrafluoroethylene (TFE) or chlorotrifluoro-ethylene (CTFE) and a $C_2$–$C_8$ olefin not containing halogen atoms, such as for instance ethylene, propylene or isobutylene, with a molar ratio between olefin not containing halogen atoms and per(halo)fluoroolefin of from 40:60 and 60:40, optionally containing small amounts, generally from 0.1 to 10% by mols, of one or more fluorinated comonomers, selected, for instance, from compounds of formula $CX_2=CFR_f$, wherein X is H or F, $R_f$ is a $C_2$–$C_{10}$ fluoroalkyl, optionally containing one or more ether groups (see for instance U.S. Pat. No. 4,513,129, U.S. Pat. No. 3,624,250), or from perfluorodioxols (see for instance U.S. Pat. Nos. 3,865,845, 3,978,030, EP-73,087, EF-76,581, EP-80,187);

(2) polyvinylidenefluoride or polyvinylidenefluoride modified with small amounts, generally from 0.1 to 10% by mols, of one or more fluorinated comonomers, such as vinylfluoride, chlorotrifluoroethylene, hexafluoropropene, tetrafluoroethylene, trifluoroethylene, etc. (see for instance U.S. Pat. Nos. 4,524,194 and 4,739,024).

In the case of VDF (co)polymers (class (2)), to the reaction medium a suitable suspending agent is preferably added, such as polyvinylalcohol or cellulose water-soluble derivatives, such as alkyl- or alkylhydroxyalkyl-cellulose, in amounts generally from 0.1 to 5 per thousand by weight, preferably from 0.5 to 2 per thousand by weight, with respect to the total amount of monomers used.

Some working examples of the present invention are reported hereinunder, whose purpose is merely illustrative but not limitative of the scope of the invention itself.

EXAMPLE 1

A 500 ml autoclave equipped with a stirrer working at 900 rpm was evacuated and a solution consisting of 225 ml of demineralized water and 15 ml of tertbutanol was introduced therein. The autoclave was cooled to 0° C. and evacuated again. 65 g of chlorotrifluoroethylene (CTFE) and 2 ml of methylcyclopentane were then charged. The autoclave was then brought to a reaction temperature of 10° C. and to a reaction pressure of 14 bar with ethylene. A solution of bis-dichlorofluoroacetylperoxide (DCFAP) in isooctane, kept at −15° C. and having a concentration of 0.09 g/ml, was then gradually fed into the autoclave. About 0.1 g of DCFAP were fed at the beginning and then twice 0.1 g each hour during the polymerization. The pressure was kept constant for the overall duration of the reaction by continuously feeding ethylene. After 185 minutes, about 30 g of dry polymer were obtained, containing, by moles, 49.7% of ethylene and 50.3% of CTFE (according to the data obtained by carbon elemental analysis). On the product there were determined a second melting temperature $T_{2f}$, by Differential Scanning Calorimetry (DSC) measurements, of 240.4° C., and a Melt Flow Index (MFI) (ASTM D 3275–89) of 1.7 g/10'.

The obtained product was characterized as regards thermal stability by means of the following tests:

(A) Weight loss (Δp %). The polymer in the form of powder (about 10 mg) was submitted to thermogravimetric analysis in air at 250° C. for one hour.

(B) Evolution of HF and HCl. The obtained polymer was molded at 240° C. to obtain a film having a thickness of about 500 μm. A specimen of such film, having 1×0.5 cm dimensions, was heated in an oven in a dry nitrogen flow at 300° C. for overall 2 hours. The developed gases were collected into an alkaline solution; each 30 minutes the solution was sampled and Cl⁻ and F⁻ ion concentrations were determined thereon by ionic column chromatography. The obtained results are reported in Table 1.

EXAMPLE 2 (comparative)

Example 1 was repeated in the same conditions, with the only difference that bis-trichloroacetylperoxide (TCAP) was used as initiator, in the form of a solution in isooctane having a concentration of 0.11 g/ml. The peroxide was fed at the beginning in an amount of about 0.1 g, and then twice in an amount of 0.1 g each hour during the polymerization.

After 130 minutes about 30 g of polymer containing, by moles, 47.4% of ethylene and 52.6% of CTFE (values obtained by carbon elemental analysis) were obtained. On the product there were measured $T_{2f}$=237.2° C. (DSC) and MFI=5.0 g/10'.

The obtained polymer was submitted to the thermal stability measurements described in Example 1. The obtained data are reported in Table 1.

TABLE 1

|  | EX. 1 | EX. 2(*) |
|---|---|---|
| Weight loss (Δp%) | 0.15 | 0.35 |
| EVOLVED HCl (ppm) | | |
| 30 min | 435 | 532 |
| 60 min | 881 | 1886 |
| 90 min | 1063 | 2796 |
| 120 min | 1199 | 3084 |
| EVOLVED HF (ppm) | | |
| 30 min | 288 | 218 |
| 60 min | 750 | 989 |
| 90 min | 952 | 1831 |
| 120 min | 1164 | 2167 |

(*)comparative

We claim:

1. (Co)polymerization process in suspension for preparing hydrogen containing thermoplastic fluoropolymers, wherein bis-dichlorofluoroacetylperoxide (DCFAP) is used as polymerization initiator.

2. Process according to claim 1, wherein DCFPA is used in an amount of from 0.005 to 20% by weight with respect to the total monomer amount.

3. Process according to claim 2, wherein DCFAP is used in an amount of from 0.05 to 2% by weight with respect to the total monomer amount.

4. Process according to claim 1, wherein the reaction temperature is from −30° to +30° C.

5. Process according to claim 4, wherein the reaction temperature is from −10° to +20° C.

6. Process according to claim 1, wherein the reaction medium is constituted by an organic phase, to which water is optionally added.

7. Process according to claim 6, wherein the organic phase is formed by the monomers, without addition of solvents.

8. Process according to claim 6, wherein the organic phase is formed by the monomers dissolved in an organic solvent selected from: chlorofluorocarbons; compounds containing only carbon, fluorine, hydrogen, and optionally oxygen; branched chain hydrocarbons having from 6 to 25 carbon atoms and a ratio between number of methyl groups and number of carbon atoms higher than 0.5.

9. Process according to claim 1, wherein a chain transfer agent is added to the reaction medium.

10. Process according to claim 9, wherein the chain transfer agent is selected from: ketones, esters, ethers and aliphatic alcohols having from 3 to 10 carbon atoms; hydrocarbons or halogenated hydrocarbons, having from 1 to 6 carbon atoms; bis(alkyl)carbonates wherein the alkyl has from 1 to 5 carbon atoms.

11. Process according to claim 10, wherein the chain transfer agent is chloroform.

12. Process according to claim 10, wherein the chain transfer agent is methylcyclopentane.

13. Process according to claim 1, wherein a copolymer is prepared between a $C_2$–$C_8$ per(halo)fluoroolefin and a $C_2$–$C_8$ olefin not containing halogen atoms, having a molar ratio between the olefin not containing halogen atoms and the per(halo)fluoroolefin of from 40:60 to 60:40.

14. Process according to claim 13, wherein the per(halo)fluoroolefin is selected from tetrafluoroethylene and chlorotrifluoroethylene, while the olefin not containing halogen atoms is ethylene.

15. Process according to claim 13, wherein the copolymer contains from 0.1 to 10% by mols of one or more fluorinated comonomers.

16. Process according to claim 1, wherein polyvinylidenefluoride or polyvinylidenefluoride modified with one or more fluorinated comonomers in an amount of from 0.1 to 10% by mols, is prepared.

\* \* \* \* \*